April 21, 1959            F. JEITNER            2,883,297

METHOD OF PRODUCING SHAPED SINTERED HARD MATERIAL BODIES

Filed Nov. 10, 1955

*Fig. 1*

MIXING POWDERED BASE WITH BINDER (POWDERED $Al_2O_3$ AND SOLUTION OF COLLOIDAL WATER SOLUBLE ALUMINA) = MOLDABLE MASS

↓

MOLDING

↓

DRYING

↓

SINTERING

↓

SHAPED BODY

*Fig. 2*

ADDING SOLUTION OF COLLOIDAL ALUMINA TO SOLID COMPONENTS OF BASE MATERIAL AND BINDER

↓

INTERMIXING TO OBTAIN MOLDABLE MASS

↓

MOLDING

↓

DRYING

↓

SINTERING

↓

SHAPED BODY

Inventor:
Franz Jeitner.

_United States Patent Office_ 2,883,297
Patented Apr. 21, 1959

2,883,297

METHOD OF PRODUCING SHAPED SINTERED HARD MATERIAL BODIES

Franz Jeitner, Meitingen, near Augsburg, Germany, assignor to Siemens-Planiawerke Aktiengesellschaft für Kohlefabrikate, Meitingen, near Augsburg, Germany, a corporation of Germany Application November 10, 1955, Serial No. 546,115

Claims priority, application Germany November 11, 1954

2 Claims. (Cl. 106—65)

The present invention relates to a method of producing hard material shaped bodies, for example, resistors, heating conductors, grinding wheels and the like, from powdered material comprising, for example, shaping by extrusion, drying the shaped body and thereafter compacting it in known manner by sintering.

It is already known to add a binder to powdered starting material which is suitably selected in accordance with the purpose for which the body to be made therefrom is to be used, consisting of metal, metal alloy, metal oxide, metal silicide, metal carbide and similar basic material or mixture thereof, so as to obtain a mass adapted for molding, for example, in an extruder or die press. The corresponding shaped body (green body) is dried and thereafter placed in a sintering furnace for sintering it.

Nonplastic hard materials such as silicon carbide, aluminum oxide and molybdenum disilicide require a high proportion of binder so as to impart to the corresponding mass the necessary plasticity for the further working. As binders, there are for this purpose generally used highly viscous colloidal substances of organic origin, the colloid surrounding the individual powder particles and assuring satisfactory sliding qualities. For this purpose, solutions having good wetting properties are suitably used, made of strongly swellable vegetable colloids, such as starch, agar-agar or other organic materials, such as oils, palmitic acid, and stearic acid. Artificial materials and their solutions are also used as plasticizing and binding agents.

The presence of organic plasticizing agents is however undesirable, for instance, in the bonding of metal powder, because it is in such cases generally necessary to effect the firing in a reducing atmosphere under hydrogen. The organic component is not as might perhaps be assumed burned out but is carbonized and leaves undesirable carbon residues. In the production of shaped bodies which are to be free of carbonization residues after the sintering, pure inorganic binders are therefore employed.

It is known, for instance, in the production of grinding bodies, to add finely divided $Al_2O_3$ in the form of sinter alumina to the powdered hard substance serving as abrasive particle, and to mix with water so as to form a mud which is then poured into a mold and dried. The green body which is thus obtained is then fired at the sintering temperature of the alumina. This procedure has the disadvantage that the mass to be worked is thinly liquid and cannot be formed in an extruder; if less water is added, sufficient plasticity of the mass for extrusion cannot be obtained.

In order to improve the plasticity of alumina mixes, it is furthermore known to etch the surface of the $Al_2O_3$ with acids. Such a treatment can be effected both with hydrochloric acid and with aluminum chlorides, and in certain cases with other acids. By the formation of a readily decomposable hydroxy-chloride, the surface of the aluminum oxide particles is peptized and as a result, the friction between the individual particles is strongly reduced. The plasticity obtained, however, is sufficient for the molding of the mass in an extruder only if the basic materials used, acting as lean materials, are plastic and if their percentage in the mass is small as compared with the binders. The plasticity required for the extrusion of masses which contain powdered metals or hard substances such as metal silicide and metal carbide can however not be obtained by the peptizing of the $Al_2O_3$ acting as binder. Frequently an addition of hydrochloric acid to such masses is undesirable if reactions with the filler may take place. Furthermore, the acid attacks the molding or press tools.

The present invention avoids the etching of the aluminum oxides with acids and the use of organic plasticizing agents and makes possible the formation of a mass suitable even for extrusion, containing a high percentage of lean substances and $Al_2O_3$ as binder. In accordance with the invention, plastic masses may be produced which can be shaped in an extruder, containing up to 90% referred to the total volume of the mass of powdered, difficultly pressable basic materials which act as lean materials and consist of metals, metal oxides, metal carbides, metal silicides, metal borides and similar substances or mixtures of such substances. This high percentage of difficultly pressable lean materials can even be further increased if the shaping is effected in molds or dies. The method of the invention may also be used for the production of synthetic hollow articles if pulverized coke, graphite or the like is used as base material.

A further advantage of the invention is that no addition of fluxes is required so that reactions between the mixtures components are avoided and the heat resistance of the $Al_2O_3$ is not impaired.

The salient features of the invention are briefly indicated in Figs. 1 and 2 of the accompanying drawing.

These indicated advantages are obtained in accordance with the invention in adding a mixture of finely powdered, highly voluminous $Al_2O_3$ and a solution of colloidal, water-soluble alumina, as binder to the powdered base materials and thoroughly mixing these components until the mass has the plasticity and dimensional stability required for processing in an extruder. The water-soluble colloidal alumina which is used in this connection is available on the market in the form of a crystalline powder under the designation "Tonerdegel" (alumina gel). This substance is made in the form of a white crystalline powder containing about 35% to 45% amorphous, hydrolyzed aluminum oxide and crystal water. This alumina gel is produced by neutralization of sodium aluminate with subsequent hydrolization for the removal of all ions and salts which might affect the colloidal properties thereof. The product is accordingly of highest purity. It is soluble in water and is used in the textile industry to impregnate fabrics.

The solution of colloidal, water-soluble alumina may be used in different concentrations, proportionally larger quantities being required with an increase in the concentration of the solution as compared with solid $Al_2O_3$ in order to obtain the optimum plasticity. A particularly high plasticity is exhibited by mixtures which contain about 1 to 1.3 parts of a 30 to 50% solution of the colloidal alumina per 1 part $Al_2O_3$. By changing the mixture ratio and the concentration of the colloidal alumina solution, it is possible to control as desired the plastic properties of the final mix comprising the basic material and the binder and plasticizing agent consisting of the mixture of the colloidal alumina solution and finely divided aluminum oxide.

The mass is preferably prepared by taking the solid components of the base materials and of the binder in the desired ratio and mixing them together well. The solution of colloidal alumina is then added and the mass is thoroughly mixed in a trough or roller kneader until after a short time, in about 10 to 20 minutes, the most favorable plasticity is obtained, and the mass can be molded. The subsequent treatment of the shaped articles may be effected as desired since the shaped articles have good dimensional stability before and after their drying.

In series of experiments which were carried out in practice, alumina gel of coarse particle size was used which had a water content of 19% (determined at 105° C). Solutions of various concentration were prepared by using weighed undried amounts of such gel with distilled water. The following specific gravities and viscosities were found for the resulting solutions at increasing concentrations.

| Concentration, Percent Alumina Gel | Specific Gravity | Viscosity |
| --- | --- | --- |
| 5 | 1.023 | 1.159 |
| 10 | 1.047 | 1.443 |
| 15 | 1.071 | 1.624 |
| 20 | 1.095 | 1.870 |
| 25 | 1.119 | 2.215 |
| 30 | 1.143 | 2.630 |
| 40 | 1.190 | 4.050 |
| 50 | 1.238 | 6.905 |

There are given below a few examples of masses prepared in accordance with the invention, which may be molded particularly well in an extruder.

(1) The following mixture ratios have proven satisfactory for the production of sintered corundum parts:

6 parts SiC particle size 0.06 mm.
3 parts $Al_2O_3$
4 parts 40% alumina gel solution The dried shaped body contains 56.5% SiC and 43.5% $Al_2O_3$.

(1a) 2 parts SiC particles $<10\mu$
3 parts $Al_2O_3$
4.5 parts 35% alumina gel solution The dried shaped body contains 31% SiC and 69% $Al_2O_3$.

(2) 9 parts powdered anthracite
3 parts $Al_2O_3$
4 parts 50% alumina gel solution The dried shaped body contains 64% anthracite and 36% $Al_2O_3$.

(3) 20 parts molybdenum disilicide, finely ground
2 parts $Al_2O_3$
5 parts 50% alumina gel solution The dried shaped body contains 81.6% molybdenum disilicide and 18.4% $Al_2O_3$.

(4) 3 parts Ni powder
3 parts $Al_2O_3$
3 parts 40% alumina gel solution

The dried shaped body contains 58.3% nickel and 41.7% $Al_2O_3$.

The masses prepared in accordance with the indicated mixtures after shaping in the extruder give bars which are elastic in moist condition; they are of stable dimensions, both before and after the drying. The high binding and adhesive power of the mixture of finely ground $Al_2O_3$ and the aqueous solution of alumina gel also facilitates shaping in accordance with other shaping processes, such as for instance in die presses or ramming or jolting. Additions of for instance a few percent of such a binder suffice to obtain a satisfactory green bond strength. The corresponding bodies may be handled readily in green condition. The filmlike distribution of the binder assures a high strength in fired state, even in the case of small quantities of binder. It is also possible to use the process for the production of catalysts in which $Al_2O_3$ is employed as the catalyst support.

Changes may be made within the scope and spirit of the appended claims.

I claim:

1. The method of preparing sinterable and powdered material containing a metal atom which is normally difficult to process for producing bodies in an extrusion press, which consists essentially of the following steps: intermixing said sinterable and powdered material with substantially 2 to 3 parts of finely divided $Al_2O_3$ and substantially 3 to 5 parts of a gel in a concentration of substantially from 5 to 50% of colloidal water soluble alumina in the form of a crystalline powder containing, in a dry state, substantially from 37% to 45% aluminum oxyhydrate to obtain a mass having the plasticity and mechanical stability for extruding bodies including up to substantially 90% of the initial sinterable and powdered material with reference to the total volume of the mass, and the amount of said water-soluble colloidal alumina used increasing with higher concentration of solution as compared with the amount of crystalline $Al_2O_3$, so that said extruded bodies are elastic in the moist condition thereof.

2. The method according to claim 1, wherein said sinterable and powdered material is finely ground molybdenum disilicide in an amount of substantially 20 parts, the amount of $Al_2O_3$ being in an amount of substantially 2 parts, and said extruded bodies containing prior to sintering substantially 81.6% molybdenum disilicide and 18.4% $Al_2O_3$.

References Cited in the file of this patent

UNITED STATES PATENTS

| | | |
| --- | --- | --- |
| 1,527,874 | Hood | Feb. 24, 1925 |
| 1,942,431 | Jung | Jan. 9, 1934 |
| 2,284,858 | Biefeld et al. | June 2, 1942 |

OTHER REFERENCES

Hackh's Chemical Dictionary, 3rd edition, page 40.